(12) United States Patent
Kpadonou et al.

(10) Patent No.: US 11,747,499 B2
(45) Date of Patent: Sep. 5, 2023

(54) FULL-WAVEFORM INVERSION USING PARTIAL TIME SHIFTS AND ENHANCED KINEMATIC TRANSFORMS

(71) Applicant: CGG SERVICES SAS, Massy (FR)

(72) Inventors: Felix Kpadonou, Massy (FR); Jeremie Messud, Palaiseau (FR)

(73) Assignee: CGG SERVICES SAS, Massy (FR)

( * ) Notice: Subject to any disclaimer, the term of this patent is extended or adjusted under 35 U.S.C. 154(b) by 141 days.

(21) Appl. No.: 17/325,851

(22) Filed: May 20, 2021

(65) Prior Publication Data
US 2022/0221603 A1    Jul. 14, 2022

Related U.S. Application Data (60) Provisional application No. 63/137,438, filed on Jan. 14, 2021.

(51) Int. Cl.
*G01V 1/28* (2006.01)
*G01V 1/30* (2006.01)

(52) U.S. Cl.
CPC .............. *G01V 1/282* (2013.01); *G01V 1/303* (2013.01); *G01V 2210/614* (2013.01); *G01V 2210/67* (2013.01)

(58) Field of Classification Search
CPC .......... G01V 1/282; G01V 1/303; G01V 1/30; G01V 1/32; G01V 2210/614; G01V 2210/67
See application file for complete search history.

(56) References Cited

U.S. PATENT DOCUMENTS

| | | | | |
|---|---|---|---|---|
| 10,976,457 | B2 * | 4/2021 | Cooper | G01V 1/306 |
| 11,048,001 | B2 * | 6/2021 | Zhang | G01V 1/282 |
| 11,215,720 | B2 * | 1/2022 | Wang | G01V 1/368 |
| 2019/0086564 | A1 * | 3/2019 | Shen | G01V 1/282 |
| 2019/0302290 | A1 * | 10/2019 | Alwon | G01V 99/005 |
| 2020/0309980 | A1 * | 10/2020 | Wang | G01V 1/32 |

(Continued)

FOREIGN PATENT DOCUMENTS

| | | | | |
|---|---|---|---|---|
| CN | 107894618 A | * | 4/2018 | G01V 1/36 |

OTHER PUBLICATIONS

Félix Kpadonou et al., "Optimal transport FWI with graph transform: Analysis and proposal of a partial shift strategy." 82nd EAGE Annual Conference & Exhibition, Amsterdam, The Netherlands, Oct. 2021, pp. 1-5.

(Continued)

*Primary Examiner* — Manuel A Rivera Vargas
*Assistant Examiner* — Yaritza H Perez Bermudez
(74) *Attorney, Agent, or Firm* — Patent Portfolio Builders PLLC (57) ABSTRACT

A permutation that optimizes correspondence between the seismic data and the simulated data is computed using a graph space optimal transport formulation-based misfit. The seismic data or simulated data are transformed into auxiliary data by applying a portion of time shifts computed from the optimal permutation before updating the structural model of the explored underground formation. The full-waveform inversion minimization of the distance between auxiliary data and the seismic data or simulated data to which partial time shifts have not been applied, may be embedded in a Kantorovich-Rubinstein norm.

20 Claims, 9 Drawing Sheets

(56) References Cited

U.S. PATENT DOCUMENTS

2021/0018639 A1* 1/2021 Sun .................. G01V 1/303
2021/0063590 A1* 3/2021 Cooper .............. G01V 1/282

OTHER PUBLICATIONS

Search Report in corresponding/related British Application No. 2116570.9 dated May 3, 2022.

O. Hermant et al., "Imaging Complex Fault Structures On-shore Oman Using Optimal Transport Full Waveform Inversion," EAGE 2020 Annual Conference online, Dec. 2020, 5 pages.

A. Pladys et al., "Graph Space Optimal Transport based FWI: 3D OBC Valhall case study," SEG International Exposition and 90th Annual Meeting, 2020, pp. 696-700.

A. Sedova et al., "Acoustic Land Full Waveform Inversion on a Broadband Land Dataset: the Impact of Optimal Transport," 81st EAGE Conference & Exhibition 2019, Jun. 3-6, 2019, London, UK, Th_R08_07, 5 pages.

Dimitri P. Bertsekas et al., "The Auction Algorithm for the Transportation Problem," Annals of Operations Research 20, 1989, pp. 67-96.

Giuseppe Provenzano et al., "Joint FWI of diving and reflected waves using a graph space optimal transport distance: synthetic tests on limited-offset surface seismic data," SEG International Exposition and 90th Annual Meeting, 2020, pp. 780-784.

J. Messud et al., "Multidimensional Optimal Transport for 3D FWI: Demonstration on Field Data," 81st EAGE Conference & Exhibition 2019, Jun. 3-6, 2019, London, UK, Tu R08 02, 5 pages.

L. Metivier et al, "A graph-space approach to optimal transport for full waveform inversion," SEG International Exposition and 88th annual Meeting, 2018, pp. 1158-1162.

L. Metivier et al., "A Graph-Space Optimal Transport Approach for Full Waveform Inversion," 80th EAGE Conference & Exhibition 2018, Jun. 11-14, 2018, Copenhagen, Denmark, We A12 04, 5 pages.

L. Métivier et al., "Measuring the misfit between seismograms using an optimal transport distance: application to full waveform inversion," Geophysical Journal International, 2016, pp. 345-377, vol. 205.

M. Wang et al., "Dynamic-warping full-waveform inversion to overcome cycle skippin," SEG International Exposition and 86th Annual Meeting, 2016, pp. 1273-1277.

T. Wang et al., "Enhance Dynamic-Warping for FWI to Mitigate Cycle-Skipping," 81st EAGE Conference & Exhibition 2019, Jun. 3-6, 2019, London, UK, 5 pages.

* cited by examiner

FULL-WAVEFORM INVERSION USING PARTIAL TIME SHIFTS AND ENHANCED KINEMATIC TRANSFORMS

TECHNICAL FIELD

Embodiments of the subject matter disclosed herein generally relate to Full-Waveform Inversion (FWI) methods and devices; more specifically, to FWIs applying partial time shifts between real and simulated data, thereby better avoiding cycle-skipping from the very first FWI iterations.

DISCUSSION OF THE BACKGROUND

Seismic exploration is used to determine the presence and location of subterranean (i.e., underground) natural resources such as (but not limited to) oil and gas. Seismic waves injected into an explored formation are detected after traveling therethrough and converted into seismic data (i.e., amplitude versus time pairs) by sensors placed at known locations. Seismic data is then processed to generate a structural image of the explored formation. Here, "image" should be understood broadly as representing a 3D (three-dimensional) map of geophysical attribute values representing the explored formation. The geophysical attributes may be seismic wave propagation velocity, density, impedance, etc. These attribute values allow identifying the composition and approximating the shape (i.e., outer surface) of 3D volumes inside the explored formation. While the image does not provide an accurate location of the sought-after resources, it suggests, to those trained in the field, the presence or absence thereof, enabling evaluation of resource reservoirs and planning extraction or the targeted resources. Because obtaining high-resolution images via seismic exploration is expensive and challenging, it is subject to ongoing research and improvements both relative to seismic data acquisition and relative to seismic data processing.

Figure 1:
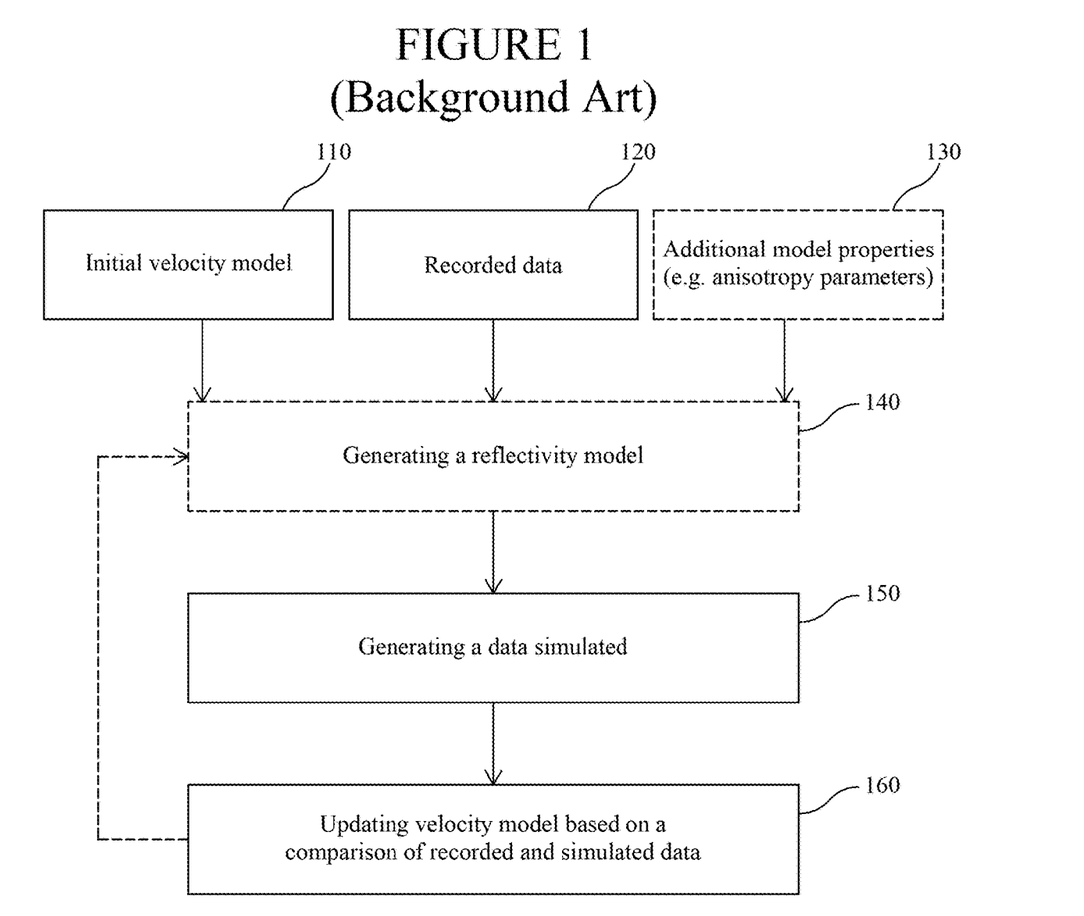
FIG. 1 is diagram illustrating the FWI technique.

FIG. 1 generically illustrates FWI technique that iteratively improves a structural model (e.g., a velocity model) of an explored formation. The model is updated to minimize the difference between simulated data generated using the model and seismic data acquired over the explored formation. The structural model improved via FWI is an image of the explored formation.

The inputs of FWI are an initial (velocity) model 110, the recorded data 120 acquired over the explored formation and, optionally, additional geophysical information 130, such as other property (e.g. anisotropy, density, etc.) values, well log information, etc. A reflectivity model may be generated at 140 to assess the changes of direction and possible split of incident seismic waves due to reflections and/or refractions when the wave crosses interfaces between volumes with different seismic wave propagation velocities. Alternatively, the velocity model may be directly used to generate the simulated data. The simulated data generated based on the model(s) at 150 is compared with the recorded data 120 to update the velocity model at 160. The closer simulated data reproduces the acquired data, the higher the quality of the model, which is an image of the explored formation. As already mentioned, FWI is an iterative process (see the loop over 140-160 in FIG. 1), ending after a predetermined number of iterations or when a convergence criterion is met.

Although FWI has the potential to produce accurate and high-resolution velocity models, it is an ill-posed non-linear process with various intertwined difficulties such as cycle-skipping (which results in the FWI update being trapped at a local minimum), amplitude effects (due to noise in real data and that modeling only approximates real-world wave propagation) and limitations due to acquisition (e.g., a limited range of source-to-receiver horizontal distance) that render FWI a highly under-determined problem. In spite of the efforts and successes achieved in perfecting FWI, the different approaches have not yet achieved a coherent solution able to address all the challenges FWI poses.

Conventional FWI is based on a least squares (LS) misfit function, which has proven to be effective for high-resolution velocity model-building. However, LS FWI is plagued by cycle-skipping, which requires starting from a good initial model to have a better outcome. Many alternative misfit functions have been proposed to mitigate the requirement to start from a good initial model. Among those, misfits based on the optimal transport (OT) theory recently stirred interest in geophysics. In the 2016 article "Measuring the misfit between seismograms using an optimal transport distance: Application to full waveform inversion" by Métivier, L. et al., published in *Geophysical Journal International* 205, pp. 345-377, it has been proposed to use the Kantorovich-Rubinstein (KR) norm-based version of OT, inspired from a 1-Wasserstein distance, which allows considering seismic data directly without any transformation. Encouraging results were obtained in an industrial context using KR in FWI (e.g., as described in the 2019 article "Multidimensional Optimal Transport for 3D FWI: Demonstration on Field Data" by Messud et al., published in 81*st EAGE Conference and Exhibition, Extended abstract*, Tu R08 02; the 2019 article "Acoustic Land Full Waveform Inversion on a Broadband Land Dataset: the Impact of Optimal Transport" by Sedova et al., published in 81*st EAGE Conference and Exhibition, Extended abstract*, Tu R08 07; and in the 2020 article "Imaging Complex Fault Structures On-shore Oman Using Optimal Transport Full Waveform Inversion" by Hermant et al., published in 82*nd EAGE Conference and Exhibition, Extended abstract*).

More recently, the article "A graph-space approach to optimal transport for full waveform inversion" by Métivier et al., published in 80*th EAGE Conference and Exhibition*, We A12 04, proposed a complementary OT version inspired from a 2-Wasserstein distance together with a specific positive transformation of the data called "graph transform." This formalism, called graph space (GS) OT, allows to apply time shifts to events contained in the data (whereas KR enhances the kinematics information without shifting events). The time shifts application shares some similarity with the dynamic warping FWI approach described in the 2016 article "Dynamic-warping FWI to overcome cycle skipping" by Wang et al., published in 86*th SEG Expanded Abstracts*, pp. 1273-1277. The GS OT approach yields robustness with respect to cycle-skipping. Encouraging results were presented in the 2018 article by Métivier et al.; the 2020 article "Joint FWI of diving and reflected waves using a graph space optimal transport distance: Synthetic tests on limited-offset surface seismic data" by Provenzano et al., published in *SEG Technical Program Expanded Abstracts*, pp. 780-784; and the 2020 article "Graph space optimal transport based FWI: 3D OBC Valhall case study" by Pladys et al., published in *SEG Technical Program Expanded Abstracts*, pp. 696-700.

Thus, there is a need to propose methods and systems that overcome all the drawbacks and limitations of conventional FWI approaches. All the articles mentioned in this section are incorporated by reference in their entirety.

SUMMARY

Methods and apparatuses according to various embodiments perform a FWI of seismic data with a partial time shift computed according to an optimal GS OT permutation and applied to seismic data acquired over an explored formation or to simulated data emulating the seismic data using a subsurface model. The kinematic information may be enhanced by performing an enhanced kinematic transform (EKT) when applying the partial time shift. This approach brings more robustness to cycle-skipping from the very first iterations regardless the quality of the initial formation model used by FWI.

According to an embodiment there is an FWI method for exploring an underground formation. The method includes obtaining seismic data acquired over a subsurface formation and a structural model of the subsurface formation, and then generating simulated data that emulates the seismic data, using the structural model. The method further includes determining a permutation that optimizes correspondence between the seismic data and the simulated data, using a graph space (GS) optimal transport (OT)-based misfit, and calculating auxiliary data by applying a portion of time shifts corresponding to the permutation, to the seismic data or to the simulated data. The method then updates the structural model by seeking to minimize a difference between the auxiliary data and the seismic data or the simulated data, to which the portion of time shifts has not been applied. The structural model is used to exploit subterranean natural resources within the subsurface formation.

According to another embodiment there is a seismic data processing apparatus with an interface and a processor configured to perform an FWI method for exploring an underground formation. The apparatus includes an interface and a processor connected to the interface and configured: to obtain seismic data acquired over a subsurface formation and a structural model of the subsurface formation; to generate simulated data that emulates the seismic data, using the structural model; to determine a permutation that optimizes correspondence between the seismic data and the simulated data, using a GS OT-based misfit; to calculate auxiliary data by applying a portion of time shifts corresponding to the permutation, to the seismic data or to the simulated data; and to update the structural model by seeking to minimize a difference between the auxiliary data and the seismic data or the simulated data, to which the portion of time shifts has not been applied. As above, the structural model is used to exploit subterranean natural resources within the subsurface formation.

According to yet another embodiment there is a computer-readable recording medium non-transitorily storing executable codes that when executed by a processor make the processor perform a full-waveform inversion, FWI, method for exploring an underground formation. The method includes obtaining seismic data acquired over a subsurface formation and a structural model of the subsurface formation, and then generating simulated data that emulates the seismic data, using the structural model. The method further includes determining a permutation that optimizes correspondence between the seismic data and the simulated data, using a GS OT-based misfit, and calculating auxiliary data by applying a portion of time shifts corresponding to the permutation, to the seismic data or to the simulated data. The method then updates the structural model by seeking to minimize a difference between the auxiliary data and the seismic data or the simulated data, to which the portion of time shifts has not been applied. The structural model is used to exploit subterranean natural resources (such as, oil and gas, minerals/mining and geothermal resources) within the subsurface formation.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places is not necessarily referring to the same embodiment. Further, the particular features, structures or characteristics may be combined in any suitable manner in one or more embodiments.

Embodiments described in this section overcome the problem caused by conventional (LS) FWI requirement to have a good initial model in order to avoid cycle-skipping by applying partial time shifts to acquired seismic data or to simulated data emulating the seismic data, the partial time shifts being a portion of time shifts according to a graph space (GS) optimal transport (OT) permutation. This approach essentially removes the cycle-skipping issue even if used only for a first or a few iterations in the beginning of a multi-iteration FWI process.

Figure 2:
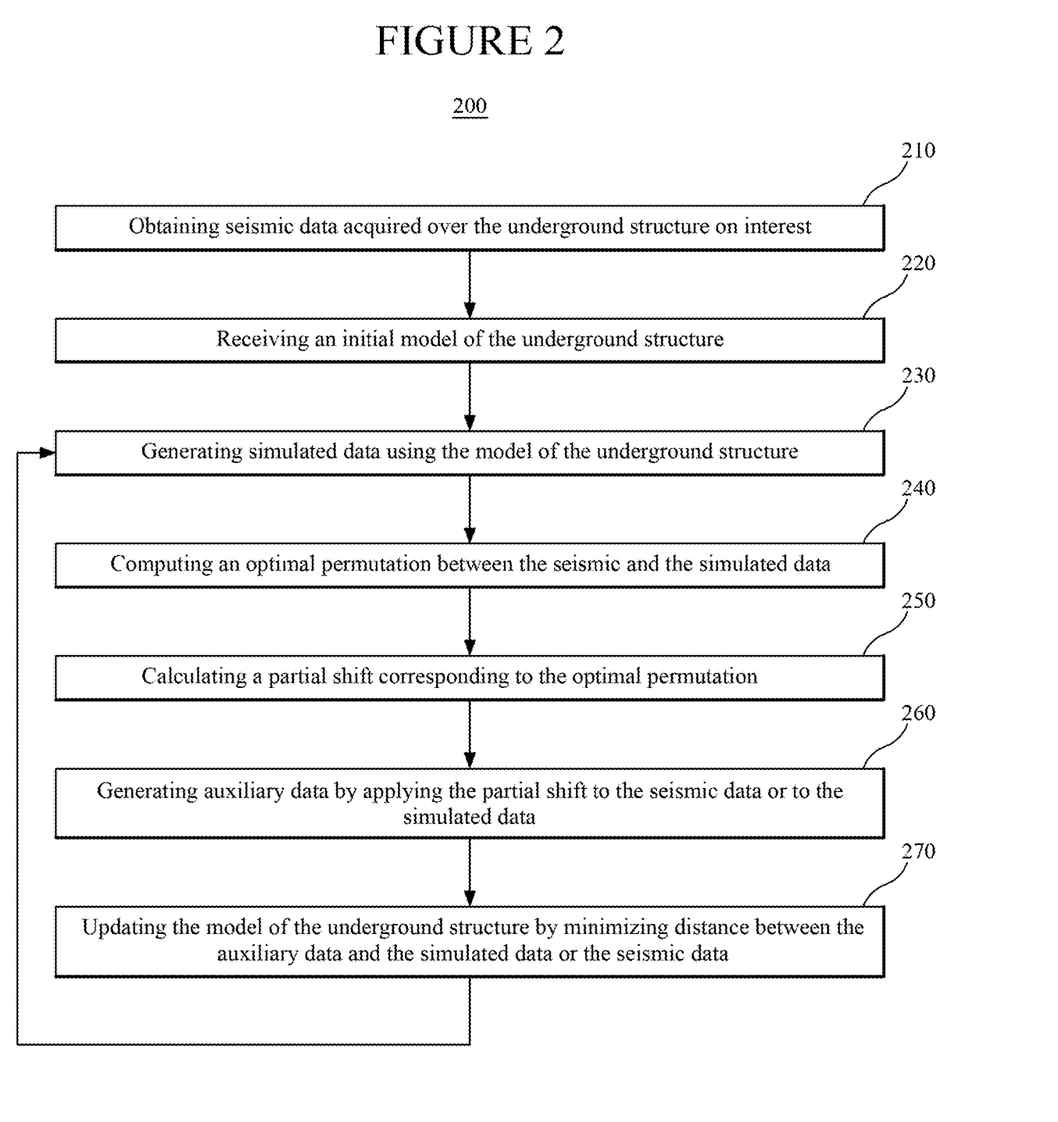
FIG. 2 a flowchart of an FWI method with partial time shift according to an embodiment.

FIG. 2 is a flowchart of a method 200 using FWI with a partial time shift according to an embodiment. At 210, seismic data acquired over the underground structure of interest is obtained. This seismic data, also called observed data, may be acquired during a recent land or marine seismic survey, or may have been acquired a while ago and is to be studied anew.

An initial model of the underground structure is received at 220. This initial model may be the result of seismic data processing using travel time tomography, previous implementations of FWI, or may be based on well log information. The model may represent p-velocity, s-velocity, anisotropy (i.e., seismic wave propagation differences depending on direction of propagation), attenuation, or any other geophysical property values.

The initial model is used to generate simulated data emulating the observed data at 230. One method of generating the simulated data is by propagating a seismic wave having the source signature through the underground structure, using the model, from a source location corresponding to source position when acquiring the seismic data, to a detection position also corresponding to a location where seismic data has been acquired.

Then, at 240, an optimal GS permutation between the observed seismic data and the simulated data is computed. A permutation vector defines a pairwise coupling between the samples of the seismic data and those of simulated data. For the GS OT problem, the permutation vector may either associate the simulated data to the seismic data or vice-versa. A full shift may be defined based on the permutation vector computed at 240.

With this permutation vector, a partial time shift (a fraction between 0 and 1 from the full shift) is calculated at 250. Auxiliary data is generated by applying the partial time shift to either the observed data or to the simulated data at 260 before updating the model at 270 to minimize a misfit between the auxiliary data and the simulated data, or the observed data to which the partial time shift has not been applied. Steps 230-270 may be reiterated using the updated model a predetermined number of time or until a predetermined criterion (e.g., convergence) is met.

In order to explain steps 240-260 in more detail, consider first least square (LS) FWI and optimal transport (OT) with Kantorovich-Rubinstein (KR) and graph space (GS) misfits.

After seismic waves are injected in the underground structure (an event known as "shot"), sensors at positions $x=\{x_i, i=1 \ldots M\}$ record observed data $d_{obs}:=\{d_{obs}(x_i), i=1 \ldots M\}$. The simulated data $d=\{d(x_i), i=1 \ldots M\}$ is generated using a subsurface model. For an $L_2$ misfit between the observed data and the simulated data $J_{L_2}(d_{obs}, d)$, the data-space gradient $\delta J/\delta d$ defines the adjoint-source, translated into the velocity-space gradient via the adjoint-state method. The LS misfit is $$J_{L_2}(d_{obs}, d) = \tfrac{1}{2}\Delta d \cdot \Delta d \qquad (1)$$

where $\Delta d = d_{obs} - d$. The LS adjoint-source (i.e., $\delta J/\delta d$) equals the data residual $\Delta d$.

The KR adjoint-source can be viewed as smart processing of $\Delta d$ that gives robustness to cycle-skipping by enhancing the low-frequency content and reducing the amplitude dynamics. The KR misfit is defined as an argmax problem (as described in the 2016 article by Metivier et al.):

$$J_{KR}(d_{obs}, d) = \max_\varphi \varphi \cdot \Delta d \qquad (2)$$

subject to $|\varphi(x_i) - \varphi(x_j)| \leq \|x_i - x_j\|_1$ and $|\varphi(x_i)| \leq K$.

In the 2018 article by Metivier et al., a GS OT formulation of misfit is based on the 2-Wasserstein distance together with a specific positive transformation of the data called "graph transform," where data amplitudes are nested with the corresponding data positions. For computational purposes, in this case, each trace data is considered independently, discrete time positions denoted as $t:=\{t_i, i=1 \ldots N\}$ being used instead of the sensor positions x. The simulated and observed data trace are two clouds of points $(t_i, d(t_i))$ and $(t_j, d_{obs}(t_j))$ of uniform mass. The OT problem can then be written as $$J_{GS}((t, d_{obs}), (t, d)) = \min_{\sigma = S(N)} \sum_{i=1,N} c_{i\sigma_i} \qquad (3)$$

with 2 $c_{ij} = |t_j - t_i|^2/t_i^2 + \alpha^2|d_{obs}(t_j) - d(t_i)|^2$.

In formula (3), S(N) represents permutations of a vector of dimension N and $c_{ij}$ is a transportation cost from the simulated data sample i to the observed data sample $j = \sigma_i$. A weighting parameter a is used to control data displacement along the time axis. An optimal permutation $\sigma^*$ may be determined using the auction algorithm described in the 1989 article "The Auction Algorithm for the Transportation Problem" by Bertsekas et al., published in *Annals of Operation Research* 20, pp. 67-96 (which is incorporated herewith by reference in its entirety) to optimize correspondence of simulated and acquired data on a trace-by-trace basis. The GS adjoint-source (i.e., the gradient relative to the misfit function) is then $$\frac{\delta J_{GS}}{\delta d} = \alpha^2 \Delta \tilde{d} \qquad (4)$$

where $\Delta \tilde{d} = \tilde{d}_{kin} - d$ and $\tilde{d}_{kin}(t_i) := d_{obs}(t_{\sigma_i^*})$. Other methods (e.g., dynamic warping) may be employed to determine an optimal permutation.

Note that the GS adjoint-source residual $\Delta \tilde{d}$ has a form similar to that of the LS residual $\Delta d$, with the difference that a time or kinematic transformation of the observed data has been performed. In other words, the samples of the data are "shifted," the shifting giving robustness to cycle-skipping, in the dynamic warping FWI manner described in the 2016 article of Wang et al. that has previously been mentioned.

Figure 3A:
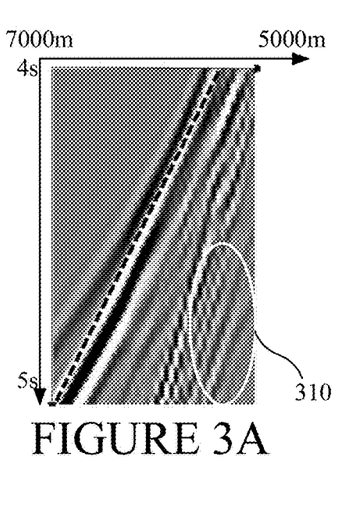
FIGS. 3A-3E are graphs illustrating the adjoint-sources in different FWI approaches.
Figure 3B:
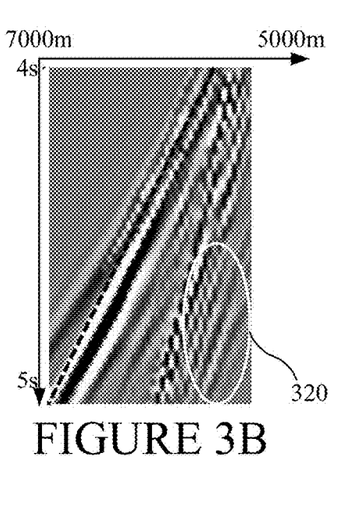
Figure 3C:
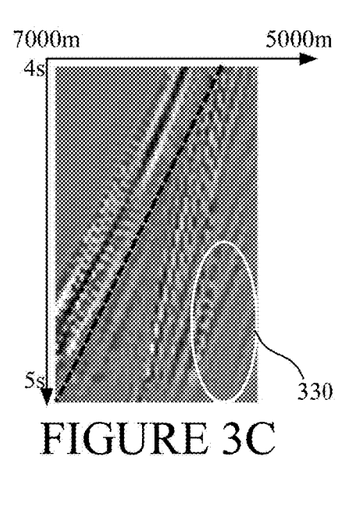
Figure 3D:
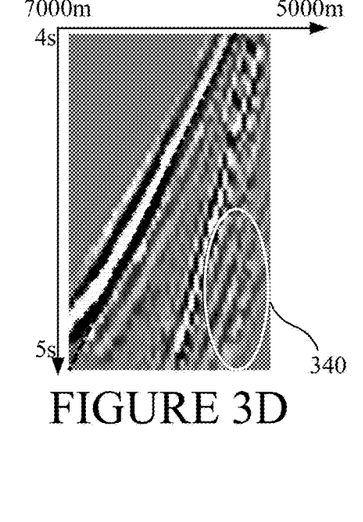

For comparing the results of FWI with different misfit functions, a dataset has been generated using the two-dimensional (2D) Marmousi 2 model in a constant-density acoustic approximation with a Ricker source centered on 6 Hz. FIGS. 3A-3E are graphs illustrating the adjoint-sources (i.e., $\delta J/\delta d$) for the initial Marmousi model in different FWI approaches. The horizontal axis represents an offset range of 5-7 km, and the vertical axis a travel time range of 4-5 s. The graph area showing most difference in the diving waves area is surrounded to emphasize the difference between the different approaches. FIG. 3A illustrates the LS adjoint-source. FIG. 3B is GS adjoint-source with a GS $\alpha = 0.04$ that only slightly changes the kinematics of the events compared to the LS residual. FIG. 3C is GS adjoint-source with a GS $\alpha = 1.2$ where the adjoint-source vanishes in the surrounded area.

As already mentioned, method 200 computes optimal permutation (at 240) and then calculates a partial time shift (at 250), based on but different from the full shift prescribed by this optimization, to avoid the vanishing adjoint-source. In one embodiment, the definition of $\tilde{d}_{kin}$ in the adjoint-source residual $\Delta \tilde{d}$ of formula (4) is changed to $$\tilde{d}_{kin}(t_i + \beta(t_{\sigma_i^*} - t_i)) = d_{obs}(t_{\sigma_i^*}). \qquad (5)$$

If the partial shift ratio $\beta = 0$, then the adjoint-source is the same as the known GS adjoint-source in (4) (i.e., no partial shift). However, if the partial shift ratio $\beta = 1$ then the adjoint-source is the LS residual. For any value of $\beta \in (0,1)$, a "partial time shift" yields a GS-type of adjoint-source with a form of kinematic transform, in the manner of the dynamic warping FWI described in the 2016 article by Wang et al. Using such a partial time shift enables using a larger value for $\alpha$ without creating a null $\Delta \tilde{d}$. This is visible by comparing FIG. 3D ($\alpha=1.2$, $\beta=0.5$) with FIG. 3C ($\alpha=1.2$, $\beta=0$) as, in the 3D graph, the adjoint-source no longer vanishes in the surrounded area.

The partial time shift approach causes significant changes in the kinematics of the events. The kinematic transform may be further enhanced using the following alternative definition of $\tilde{d}_{kin}$ in formula (4):

$$\tilde{d}_{kin}(t_{\sigma_i^*}+\beta(t_i-t_{\sigma_i^*}))=d(t_i). \qquad (6)$$

Figure 3E:
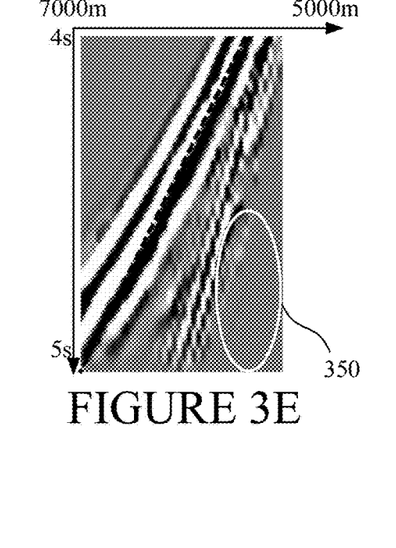

This enhanced kinematic transform (EKT) strengthens the impact of the diving waves in updating the model. For $\beta=0$, according to definition (6) the transpose of the permutation vector is applied to the modeled data (and not the permutation vector to the observed data like in equation (5), as $\sigma^*$ occurs in the left-hand side of equation (6)). A choice of $\beta \in (0,1)$ yields a partial time shift. The adjoint-source residual $\Delta \tilde{d}$ as defined in (6) is used to focus more on the kinematics change, instead of events not common to the simulated and seismic data. FIG. 3E represents the adjoint-source for $\alpha=1.2$, $\beta=0.5$ and EKT. This EKT approach yields an FWI more robust to cycle-skipping, especially in the first FWI iterations.

Note that the GS or EKT approaches can naturally be embedded in KR, replacing the residual $\Delta d$ in equation (2) by the GS "residual" $\Delta \tilde{d}$ of eq. (4). One interesting advantage of this approach is to bring the additional features of KR to EKT: enhanced low frequency content, amplitude balancing, stronger continuity in the move-out direction (KR) and "shifts" of events contained in the data (EKT), for even more robustness to cycle-skipping. The EKT approach (embedded in KR) brings more robustness to cycle-skipping than GS and KR only on Marmousi when starting the FWI with the more difficult initial model.

A preconditioned L-BFGS optimization scheme has been used during FWI tests. The Broyden-Fletcher-Goldfarb-Shanno (BFGS) algorithm is an iterative for solving unconstrained nonlinear optimization problems. As described in Fletcher's book *Practical Methods of Optimization* ($2^{nd}$ edition published by John Wiley & Sons, ISBN 978-0-471-91547), BFGS determines the descent direction by preconditioning the gradient with curvature information. BFGS gradually improves an approximation to the Hessian matrix of the loss function obtained only from gradient evaluations (or approximate gradient evaluations) via a generalized secant method. L-BFGS is a limited-memory version of BFGS that is particularly suited to problems with very large numbers of variables (e.g., >1000).

Figure 4A:
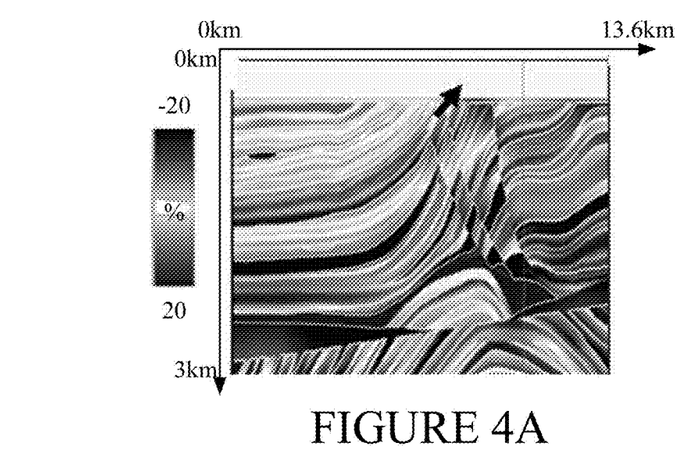
FIGS. 4A-4D are graphs illustrating FWI results for a first initial Marmousi model.
Figure 4B:
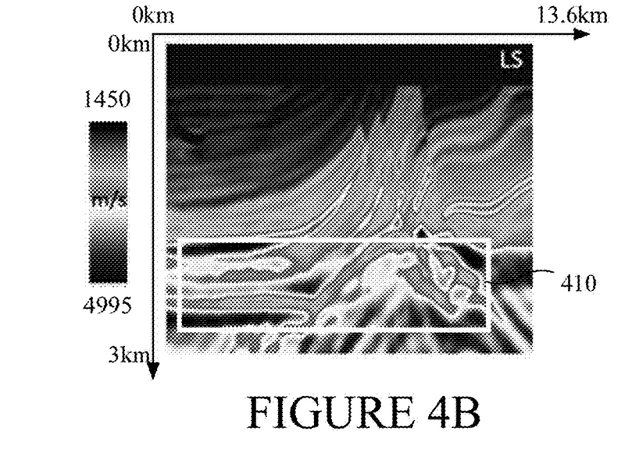
Figure 4C:
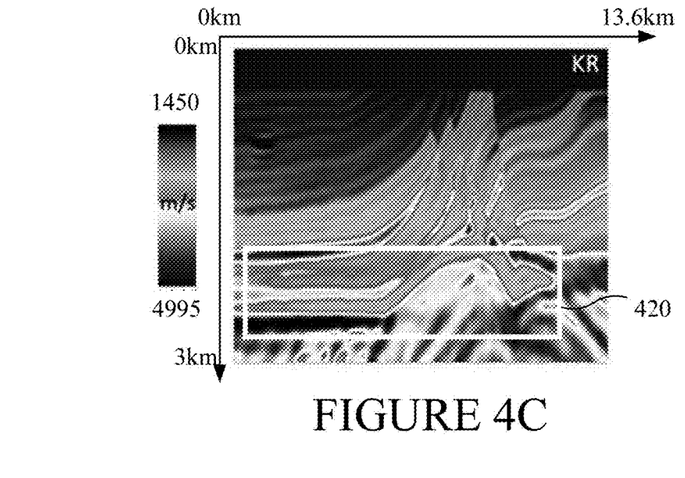
Figure 4D:
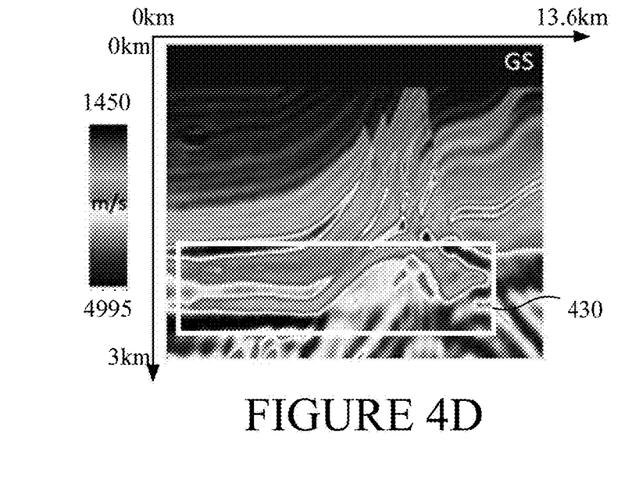

FIGS. 4A-4D are graphs representing the FWI results obtained after 30 iterations performed directly at 10 Hz (i.e., higher than the center of the Ricker source to ensure higher resolution and accuracy), keeping all the data (first break, reflections, multiples). The horizonal axis is the horizontal distance between the seismic wave source and detecting sensor (i.e., offset) in a range of 0-13.6 km and the vertical axis is depth in a range of 0-3 km. The various nuances of gray in FIG. 4A represent percentual perturbation of the true Marmousi model (in a range of −20% to 20%), used to generate the initial velocity model. The white band on top indicates no deviation at shallow depths. The graphs in FIGS. 4B-4D have the same horizontal and vertical axes as FIG. 4A, but the nuances of gray correspond to the seismic wave propagation velocity in the range of 1450 to 4995 m/s. FIG. 4B shows the FWI LS result that shows cycle skipping still occurs in the area marked by the rectangle. FIG. 4C shows the FWI KR result (see misfit function in Formula 2) and FIG. 4D shows the FWI GS result. Both KR FWI and GS FWI overcome the cycle-skipping problem in this case.

Figure 5A:
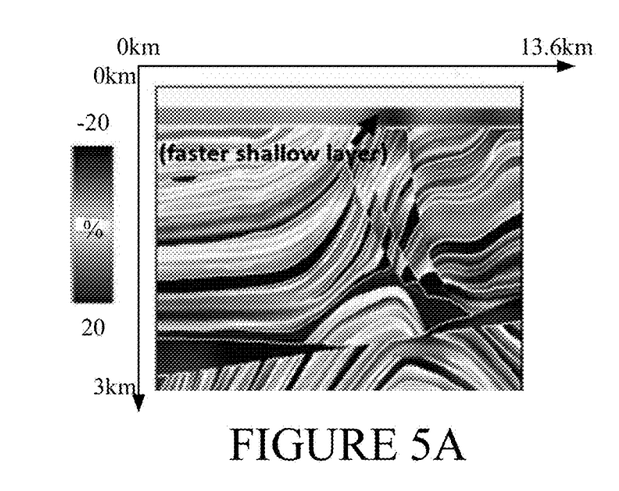
FIGS. 5A-5D are graphs illustrating FWI results for a second initial Marmousi model.
Figure 5B:
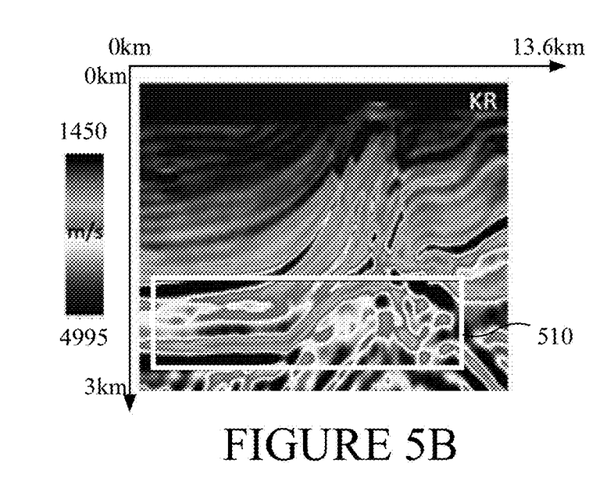
Figure 5C:
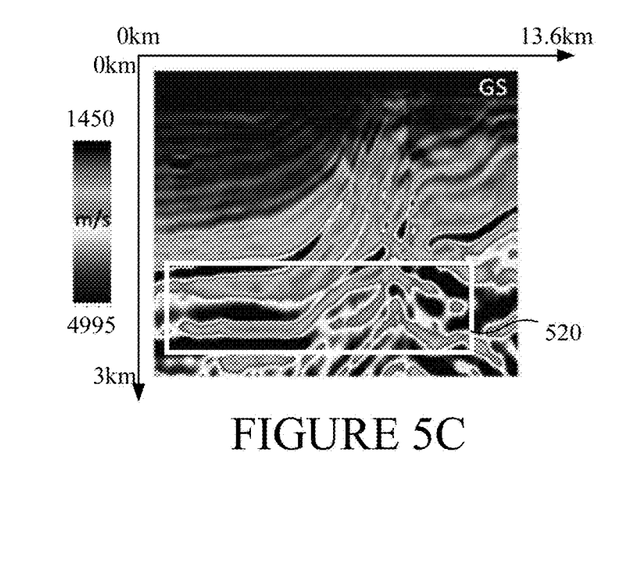
Figure 5D:
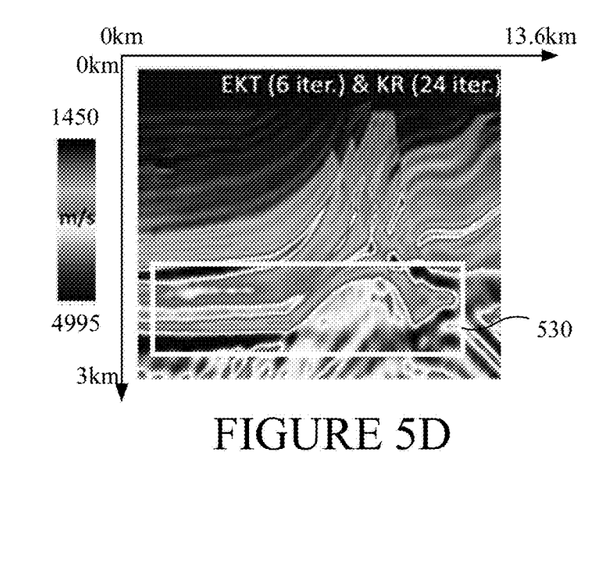

However, if as shown in FIG. 5A, an additional faster deviation band is added to the shallow layer relative to 4A, both KR FWI (whose results are illustrated in FIG. 5B having the same axes as 4B-4D) and GS FWI (whose results are similarly illustrated in FIG. 5C) fail. FIG. 5D is a graph illustrating the results of 6 iteration EKT GS FWI followed by 24 iterations of KR FWI that overcome the cycle-skipping in the area marked by the rectangle. Note that the true velocity model is retrieved in spite of the strong perturbation close to the surface.

Figure 6A:
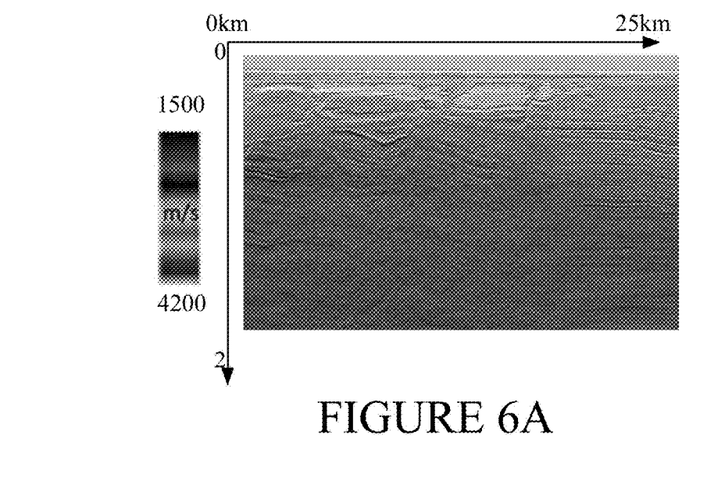
FIGS. 6A-6D are graphs illustrating FWI results in processing real data.
Figure 6B:
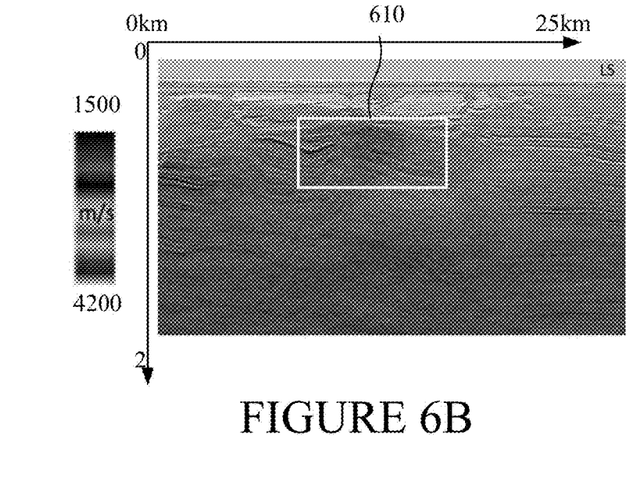
Figure 6C:
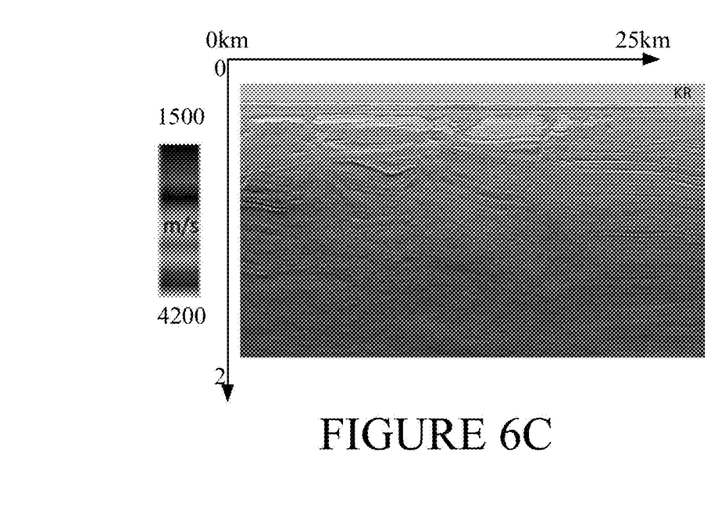
Figure 6D:
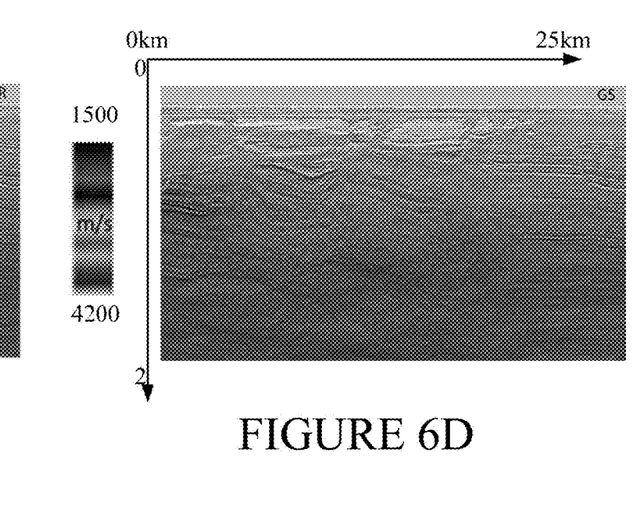

FIGS. 6A-6D are graphs related to testing FWI with different misfits on real data. The graphs show a horizonal range of 0-25 km, and a depth range of 0-2 km, the nuances of gray being velocity in a range of 1,500-4,200 m/s. The graph in FIG. 6A is the initial model, while the graphs in FIGS. 6B, 6C and 6D are the results of 3-7 Hz FWI with 8 iterations for each frequency obtained using FWI with LS misfit (FIG. 6B), FWI with KR misfit (FIG. 6C) and FWI with GS misfit (FIG. 6D). Here, starting the FWIs with a model which already contains gas pocket anomalies in the shallow layer leads to FWI LS results that still have the cycle-skipping issue in area 610, while FWI GS results and FWI KR results are not cycle-skipped and have similar quality.

Figure 7A:
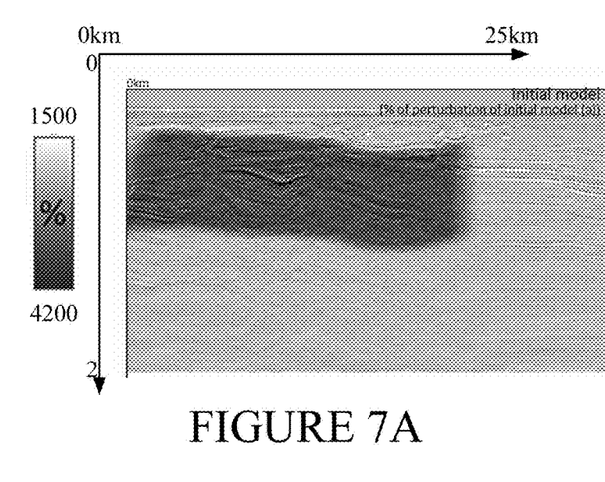
FIGS. 7A-7D are graphs illustrating FWI results in processing the same data as in FIGS. 6A-6D, but starting from another initial model.
Figure 7B:
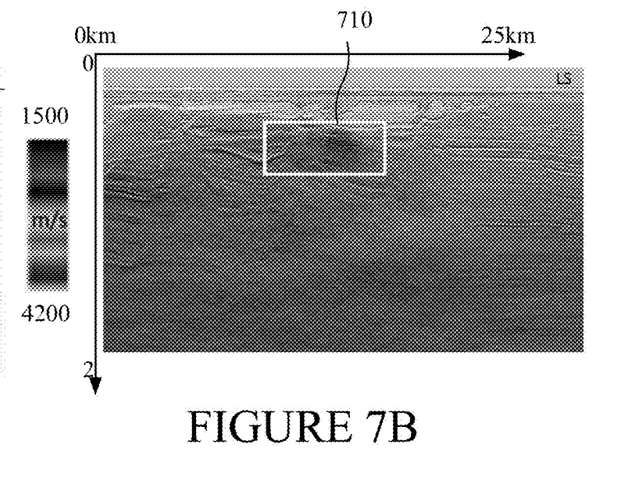
Figure 7C:
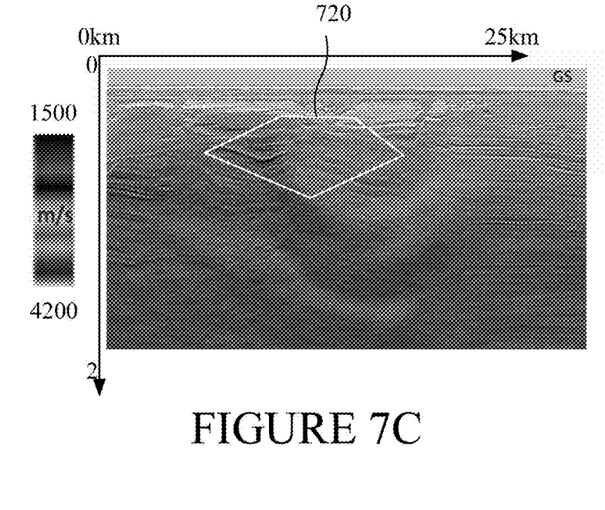
Figure 7D:
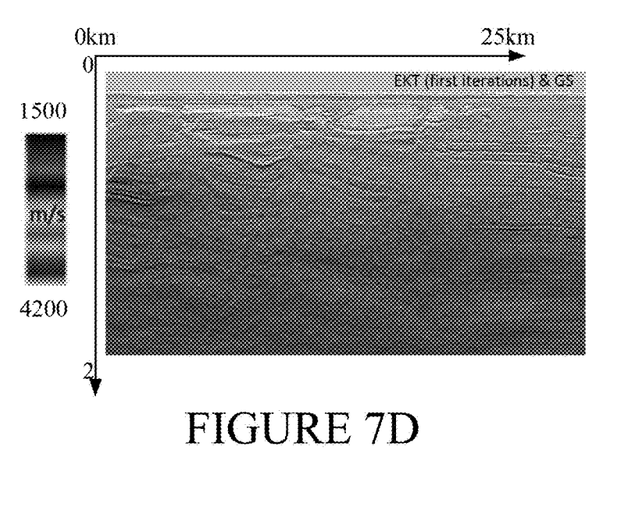

FIGS. 7A-7D are graphs showing results of processing the same real data, but starting from a model with velocities slightly increased in the deeper part. FIG. 7A shows (using nuances of gray) the percentual deviation from the model in FIG. 6A (in the range of 0-2%) of the initial model used for FWI in FIGS. 7B-7D. Data processing performed using this initial model has been the same as when the initial model was the one in FIG. 6A. FIG. 7B represents the velocity model (the nuances of gray being velocity in a range of 1,500-4,200 m/s as in FIGS. 6B-6D) obtained by FWI with LS misfit (i.e., formula (1)). FIG. 7C represents in similar manner the result obtained using FWI with GS misfit (i.e., formula (3)), and FIG. 7D represents the result obtained using FWI with GS misfit and EKT in the first iteration. The LS, GS (and KR not shown) continue having the cycle-skipping problem at least in areas 710 and 720, whereas if EKT is applied at the first iterations, cycle-skipping is no longer present.

Figure 8:
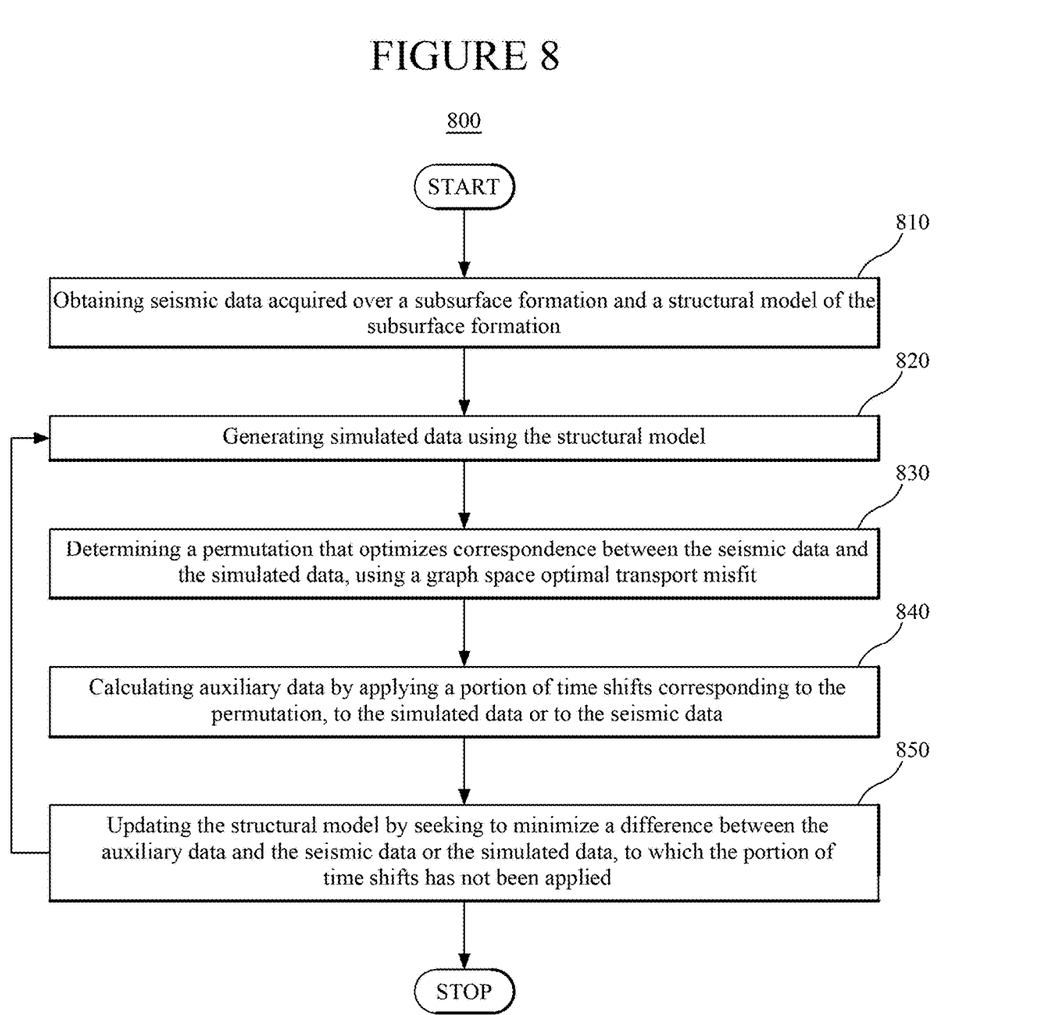
FIG. 8 is a flowchart of an FWI method according to another embodiment.

FIG. 8 is a flow diagram of an FWI method 800 according to another embodiment. Method 800 includes obtaining seismic data acquired over a subsurface formation and a structural model of the subsurface formation at 810. Here the model may be a velocity model or a reflectivity model, etc. The structural model associates geophysical attribute values (e.g., seismic wave propagation velocity, reflectivity, etc.) with physical locations or volumes.

Method 800 further includes generating simulated data emulating the seismic data using the structural model at 820. That is, the simulated data matches the data acquisition conditions (e.g., source location, receiver location, insofar as they are known) of the seismic data acquired over the subsurface formation, and seismic wave propagation through the subsurface formation is simulated using the structural model. Further, at 830, a permutation that optimizes a correspondence between the seismic data and the simulated data is determined using GS OT-based misfit (previously discussed in more detail, employing techniques from the 2018 article by Metivier et al. and the 1989 article by Bertsekas et al.). In one embodiment, other methods (e.g., dynamic warping) may be employed to determine the optimal permutation.

Method 800 then calculates auxiliary data by applying a portion of (i.e., partial) time shifts corresponding to the permutation to samples of one of the seismic data and the simulated data at 840. Then, at 850, method 800 updates the structural model by seeking to minimize a difference between the auxiliary data and the seismic data or the simulated data to which the portion of time shifts has not been applied. As previously pointed out, the structural model may be used to locate and/or exploit subterranean natural resources (e.g., oil and gas) within the subsurface formation. The difference may be minimized in a Kantorovich-Rubinstein norm.

In one embodiment, the structural model is updated using an adjoint source as in $\alpha^2 \Delta \tilde{d}$ where $\Delta \tilde{d}=\tilde{d}_{kin}-d$ with $$\tilde{d}_{kin}(t_i+\beta(t_{\sigma_i^*}-t_i))=d_{obs}(t_{\sigma_i^*}),$$

$d_{obs}$ representing the seismic data, $t_i$ for i=1 ... N representing sample times along a trace, $\sigma^*$ representing the permutation, $\alpha$ being a weighting parameter and $\beta$ a partial shift ratio, $\beta \in (0, 1)$.

In another embodiment, the structural model is updated using an adjoint-source $\alpha^2 \Delta \tilde{d}$ where $\Delta \tilde{d}=\tilde{d}_{kin}-d$ with $$\tilde{d}_{kin}(t_{\sigma_i^*}+\beta(t_i-t_{\sigma_i^*}))=d(t_i),$$

d representing the simulated data, $t_i$ for i=1 ... N representing sample times along a trace, $\sigma^*$ representing the permutation, $\alpha$ being a weighting parameter and $\beta$ a partial shift ratio, $\beta \in (0,1)$.

Note that steps 820-850 may be repeated a predetermined number of times or until a convergence criterion is met. In various embodiments, the FWI technique may be refined to include additional constraints or regularization techniques. For example, constraints may be designed to honor a priori information about the substructure formation or to favor certain features in the structural model. A non-exhaustive list of additional constraints and other rules include:

imposing a mask, or a no-update rule in predefined zones of the model;
incorporating information from well logs;
incorporating other a priori information, for example, from 4D differences or a tomographic model update;
imposing a bound, or box constraint, on the model parameters;
imposing an edge-preserving constraint;
imposing a total-variation constraint;
imposing a hinge-loss one-sided constraint;
imposing a cross-gradient constraint imposing facies-based constraints;
imposing constraints to promote a specific feature of the updated model; and
a combination of one or more constraints listed above.

In one embodiment, the permutation is a vector from the seismic data to the simulated data, and in another it is a vector from the simulated data to the seismic data.

Figure 9:
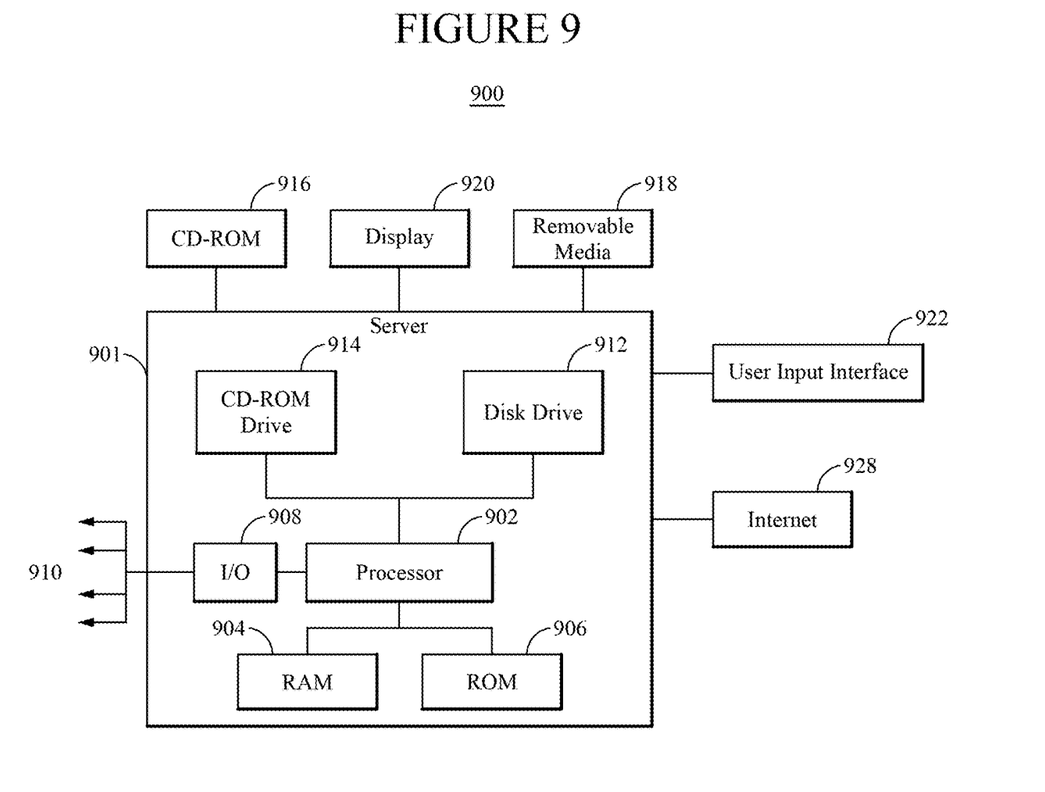
FIG. 9 is a schematic diagram of a data processing apparatus according to an embodiment.

The above-described methods may be implemented in a computing device 900 as illustrated in FIG. 9. Hardware, firmware, software or a combination thereof may be used to perform the various steps and operations described herein.

Computing device 900 suitable for performing the activities described in the exemplary embodiments may include a server 901. Server 901 may include a central processor (CPU) 902 coupled to a random access memory (RAM) 904 and to a read-only memory (ROM) 906. ROM 906 may also be other types of storage media to store programs, such as programmable ROM (PROM), erasable PROM (EPROM), etc. Processor 902 may communicate with other internal and external components through input/output (I/O) circuitry 908 and bussing 910 to provide control signals and the like. Processor 902 carries out a variety of functions as are known in the art, as dictated by software and/or firmware instructions.

Server 901 may also include one or more data storage devices, including hard drives 912, CD-ROM drives 914 and other hardware capable of reading and/or storing information, such as DVD, etc. In one embodiment, software for carrying out the above-discussed steps may be stored and distributed on a CD-ROM or DVD 916, a USB storage device 918 or other form of media capable of portably storing information. These storage media may be inserted into, and read by, devices such as CD-ROM drive 914, disk drive 912, etc. Server 901 may be coupled to a display 920, which may be any type of known display or presentation screen, such as LCD, plasma display, cathode ray tube (CRT), etc. A user input interface 922 is provided, including one or more user interface mechanisms such as a mouse, keyboard, microphone, touchpad, touch screen, voice-recognition system, etc.

Server 901 may be coupled to other devices, such as sources, detectors, etc. The server may be part of a larger network configuration as in a global area network (GAN) such as the Internet 928, which allows ultimate connection to various computing devices.

The embodiments described in this section provide methods and apparatuses for FWI in which a portion of time shifts corresponding to a permutation that optimizes correspondence between the seismic data and the simulated data is applied to simulated data or to seismic data. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. Other examples that occur to those skilled in the art are intended to be within the scope of the disclosed inventions.

What is claimed is:

1. A full-waveform inversion, FWI, method for exploring an underground formation, the FWI method comprising:
obtaining seismic data acquired over a subsurface formation and a structural model of the subsurface formation;
generating simulated data that emulates the seismic data, using the structural model;
determining a permutation that optimizes correspondence between the seismic data and the simulated data using a graph space optimal transport-based misfit;
calculating auxiliary data by applying a portion of time shifts corresponding to the permutation, to the simulated data or to the seismic data; and
updating the structural model by seeking to minimize a difference between the auxiliary data and the seismic data or the simulated data, to which the portion of time shifts has not been applied, wherein the structural model is used to exploit subterranean natural resources within the subsurface formation.

2. The FWI method of claim 1, wherein, for updating the structural model, the difference is minimized in a Kantorovich-Rubinstein norm.

3. The FWI method of claim 1, wherein the structural model is updated using an adjoint-source $\alpha^2 \Delta \tilde{d}$ where $\Delta \tilde{d} = \tilde{d}_{kin} - d$ with $$\tilde{d}_{kin}(t_i + \beta(t_{\sigma_i^*} - t_i)) = d_{obs}(t_{\sigma_i^*}),$$

$d_{obs}$ representing the seismic data, $t_i$ for $i=1 \ldots N$ representing sample times along a trace, $\sigma^*$ representing the permutation, $\alpha$ being a weighting parameter and $\beta$ a partial shift ratio, $\beta \in (0, 1)$.

4. The FWI method of claim 1, wherein the structural model is updated using an adjoint-source $\alpha^2 \Delta \tilde{d}$ where $\Delta \tilde{d} = \tilde{d}_{kin} - d$ with $$\tilde{d}_{kin}(t_{\sigma_i^*} + \beta(t_i - t_{\sigma_i^*})) = d(t_i),$$

d representing the simulated data, $t_i$ for $i=1 \ldots N$ representing sample times along a trace, $\sigma^*$ representing the permutation, $\alpha$ being a weighting parameter and $\beta$ a partial shift ratio, $\beta \in (0, 1)$.

5. The FWI method of claim 1, wherein the updating of the structural model includes at least one constraint that incorporates additional information related to the underground formation, excludes predefined zones from the updating, imposes limitations to parameters of the structural model or is a combination of constraints.

6. The FWI method of claim 1, wherein the generating of the simulated data, the determining of the permutation, the calculating of the auxiliary data and the updating of the structural model are repeated.

7. The FWI method of claim 6, wherein, after performing the calculating of the partially shifted data a first time, the portion of the time shifts corresponding to the permutation is applied to the simulated data, the structural model being then updated to minimize the difference between the auxiliary data and the seismic data.

8. A seismic data processing apparatus, comprising an interface and a processor connected to the interface and configured:
to obtain seismic data acquired over a subsurface formation and a structural model of the subsurface formation;
to generate simulated data that emulates the seismic data, using the structural model;
to determine a permutation that optimizes correspondence between the seismic data and the simulated data, using a graph space optimal transport-based misfit;
to calculate auxiliary data by applying a portion of time shifts corresponding to the permutation, to the simulated data or to the seismic data; and
to update the structural model by seeking to minimize a difference between the auxiliary data and the seismic data or the simulated data, to which the portion of time shifts has not been applied,
wherein the structural model is used to exploit subterranean natural resources within the subsurface formation.

9. The seismic data processing apparatus of claim 8, wherein the processor is configured to minimize the difference in a Kantorovich-Rubinstein norm for updating the structural model.

10. The seismic data processing apparatus of claim 8, wherein the processor uses an adjoint-source $\alpha^2 \Delta \tilde{d}$ to update the structural model where $\Delta \tilde{d} = \tilde{d}_{kin} - d$ with $$\tilde{d}_{kin}(t_i + \beta(t_{\sigma_i^*} - t_i)) = d_{obs}(t_{\sigma_i^*}),$$

$d_{obs}$ representing the seismic data, $t_i$ for $i=1 \ldots N$ representing sample times along a trace, $\sigma^*$ representing the permutation, $\alpha$ being a weighting parameter and $\beta$ a partial shift ratio, $\beta \in (0, 1)$.

11. The seismic data processing apparatus of claim 8, wherein the processor updates the structural model using an adjoint-source $\alpha^2 \Delta \tilde{d}$ where $\Delta \tilde{d} = \tilde{d}_{kin} - d$ with $$\tilde{d}_{kin}(t_{\sigma_i^*} + \beta(t_i - t_{\sigma_i^*})) = d(t_i),$$

d representing the simulated data, $t_i$ for $i=1 \ldots N$ representing sample times along a trace, $\sigma^*$ representing the permutation, $\alpha$ being a weighting parameter and $\beta$ a partial shift ratio, $\beta \in (0, 1)$.

12. The seismic data processing apparatus of claim 8, wherein, when updating of the structural model, the processor uses includes at least one constraint incorporating additional information related to the underground formation, excluding predefined zones from the updating, imposing limitations to parameters of the structural model or a combination of constraints.

13. The seismic data processing apparatus of claim 8, wherein the processor is configured to perform repeatedly the generating of the simulated data, the determining of the permutation, the calculating of the auxiliary data and the updating of the structural model.

14. The seismic data processing apparatus of claim 8, wherein, after performing the calculating of the auxiliary data a first time, the processor applies the portion of the time shifts corresponding to the permutation, to the simulated data, and updates the structural model to minimize the square of the difference between the auxiliary data and the seismic data.

15. The seismic data processing apparatus of claim 8, wherein the processor is further configured:
to determine another permutation that optimizes correspondence between the seismic data and the simulated data using a dynamic warping technique;
to calculate simulated-data-based auxiliary data by applying a portion of time shifts corresponding to the other permutation, to the simulated data; and
to update the structural model by seeking to minimize a difference between the simulated-data-based auxiliary data and the seismic data.

16. A computer-readable recording medium non-transitorily storing executable codes that when executed by a processor make the processor perform a full-waveform inversion, FWI, method for exploring an underground formation, the FWI method comprising:
obtaining seismic data acquired over a subsurface formation and a structural model of the subsurface formation;
generating simulated data that emulates the seismic data, using the structural model;
determining a permutation that optimizes correspondence between the seismic data and the simulated data using graph space optimal transport-based misfit;
calculating auxiliary data by applying a portion of time shifts corresponding to the permutation, to the simulated data or to the seismic data; and
updating the structural model by seeking to minimize a difference between the auxiliary data and the seismic data or the simulated data, to which the portion of time shifts has not been applied,
wherein the structural model is used to exploit subterranean natural resources within the subsurface formation.

17. The computer-readable recording medium of claim 16, wherein, for updating the structural model, the difference is minimized in a Kantorovich-Rubinstein norm.

18. The computer-readable recording medium of claim 16, wherein the structural model is updated using an adjoint-source used $\alpha^2 \Delta \tilde{d}$ where $\Delta \tilde{d} = \tilde{d}_{kin} - d$ with $$\tilde{d}_{kin}(t_{\sigma_i^*} + \beta(t_i - t_{\sigma_i^*})) = d(t_i),$$

d representing the simulated data, $t_i$ for $i=1 \ldots N$ representing sample times along a trace, $\sigma^*$ representing the permutation, $\alpha$ being a weighting parameter and $\beta$ a partial shift ratio, $\beta Å(0, 1)$.

19. The computer-readable recording medium of claim 16, wherein the updating of the structural model includes at least one constraint that incorporates additional information related to the underground formation, excludes predefined zones from the updating, imposes limitations to parameters of the structural model or is a combination of constraints.

20. The computer-readable recording medium of claim 16, wherein the generating of the simulated data, the determining of the permutation, the calculating of the auxiliary data and the updating of the structural model are repeated, and, after performing the calculating of the auxiliary data a first time, the portion of the time shifts corresponding to the permutation is applied to the simulated data, the structural model being then updated to minimize the difference between the auxiliary data and the seismic data.

* * * * *